United States Patent
Courpet et al.

(10) Patent No.: US 8,684,042 B2
(45) Date of Patent: Apr. 1, 2014

(54) AIRCRAFT INCLUDING A FUEL VALVE AND A CONTROL ACTUATOR FASTENED TO THE VALVE

(75) Inventors: Alexis Courpet, Fronton (FR); Thomas Barre, Toulouse (FR); Matthieu Biteau, Toulouse (FR); Olivier Bourbon, Aucamville (FR); Cedric Sable, Toulouse (FR); Jean-Marc Roques, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 184 days.

(21) Appl. No.: 13/172,018

(22) Filed: Jun. 29, 2011

(65) Prior Publication Data

US 2012/0007010 A1 Jan. 12, 2012

(30) Foreign Application Priority Data

Jul. 6, 2010 (FR) ...................................... 10 55486

(51) Int. Cl.
*A01G 25/09* (2006.01)
(52) U.S. Cl.
USPC ........................................ 137/884; 137/899.2
(58) Field of Classification Search
USPC ................. 137/899.2, 343; 251/291, 292; 244/135 C, 135 R
See application file for complete search history.

(56) References Cited

U.S. PATENT DOCUMENTS

| 418,774 | A | * | 1/1890 | Wagner, Jr. ................... 137/375 |
| 2,774,365 | A | | 12/1956 | Stewart et al. |
| 4,108,328 | A | * | 8/1978 | Page ............................ 220/4.15 |
| 2006/0138282 | A1 | * | 6/2006 | Pilkington et al. ......... 244/135 R |
| 2007/0246608 | A1 | * | 10/2007 | Tichborne et al. ......... 244/135 R |

FOREIGN PATENT DOCUMENTS

| EP | 1 749 742 A2 | 2/2007 |
| FR | 2 918 731 A1 | 1/2009 |
| WO | WO 2006/083733 A1 | 8/2006 |

OTHER PUBLICATIONS

Search Report issued in French Application No. FR 1055486 dated Feb. 14, 2011 (with translation).

* cited by examiner

*Primary Examiner* — John K Fristoe, Jr.
*Assistant Examiner* — Kevin E Lynn
(74) *Attorney, Agent, or Firm* — Oliff PLC

(57) ABSTRACT

The aircraft comprises:
a fuel valve;
an actuator for controlling the valve; and
a tank panel extending between the valve and the actuator.
It is arranged in such a manner that the bearing point(s) between the panel and a first one of the members selected from the valve and the actuator, and preferably the actuator, is/are provided by means of the second one of these members.

20 Claims, 2 Drawing Sheets

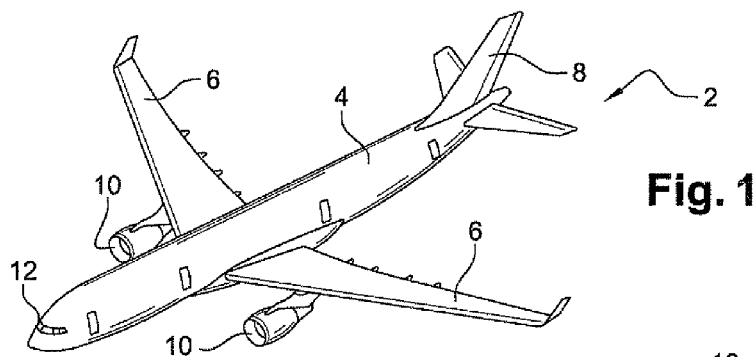
Fig. 1
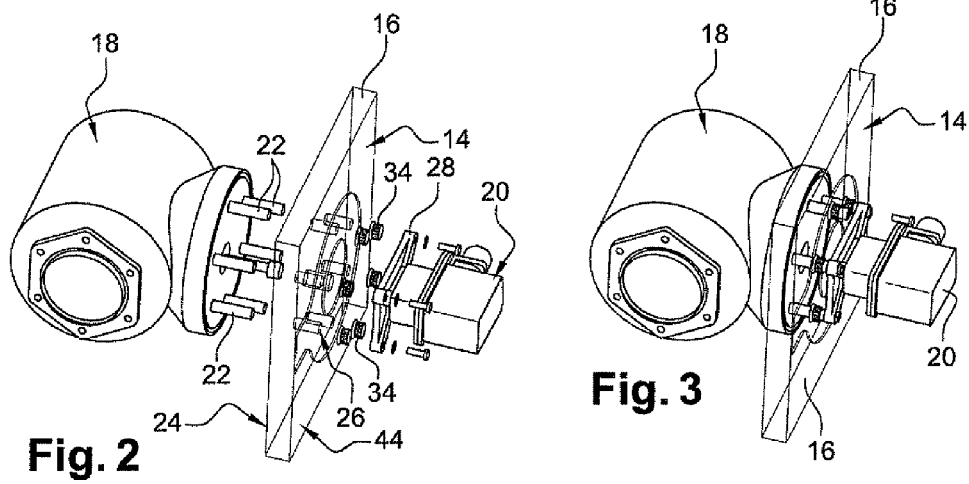
Fig. 2
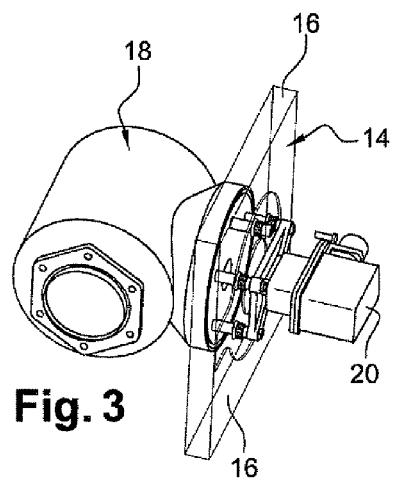
Fig. 3
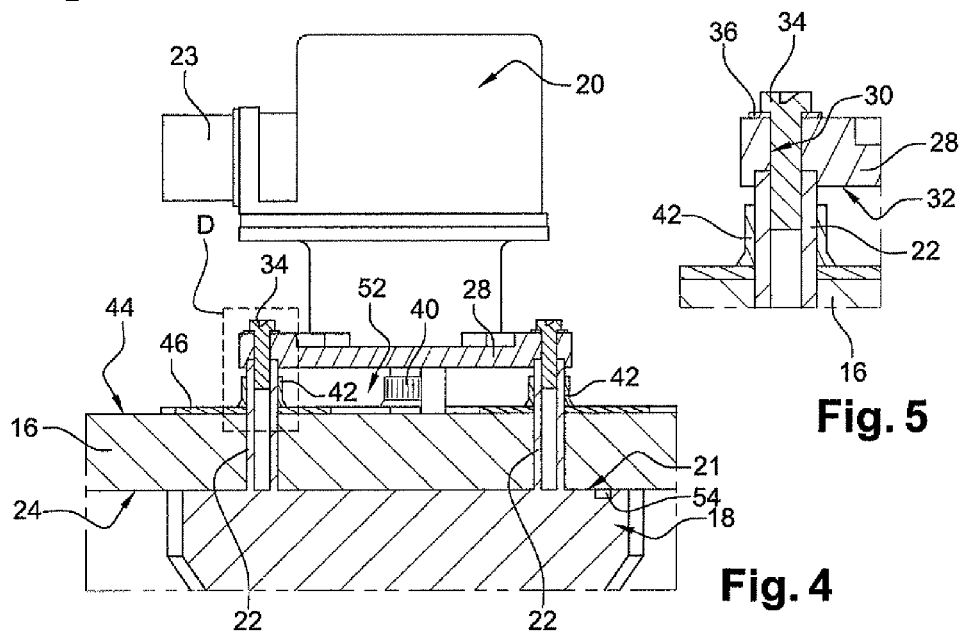
Fig. 4
Fig. 5

AIRCRAFT INCLUDING A FUEL VALVE AND A CONTROL ACTUATOR FASTENED TO THE VALVE

FIELD OF THE INVENTION

The invention relates to aircraft, and in particular to their fuel valves.

BACKGROUND OF THE INVENTION

It is known to fasten a valve for controlling the flow of fuel to a structural panel forming part of a fuel tank of an aircraft. The valve is itself controlled by means of an actuator. For safety reasons, the actuator, which is electrically powered, is located outside the tank, while the valve is inside it. These two members are thus positioned on opposite sides of the panel of the tank, being pressed against respective opposite faces of the panel. This assembly is provided by sandwiching the panel between the valve and its actuator. The valve is controlled with the help of a fluted shaft that forms part of the valve or of the actuator and that engages in a likewise-fluted bore in the other one of said members. It is thus important for the points on the panel against which these two members bear to be accurately parallel in order to guarantee that the shaft and its bore share a common axis.

The assembly of the valve and the actuator is subjected to dimensional tolerances, amongst which the thickness of the panel is thus a major item, as is the relative alignment of the valve with its actuator, where this alignment is often associated with the parallelism of the two faces of the panel. The quality with which the valve and the actuator are assembled together is thus associated with the quality of the panel itself, and in particular with the parallelism of its two bearing faces and on the tolerances concerning its thickness.

In addition, if the panel is made not of metal but of composite material, then additional defects may arise that have an influence on parallelism and on tolerance. The thickness of a panel made of composite material depends in particular on its baking and on the matrix making it up. Baking causes the composite material to expand, thereby causing the thickness of the panel to vary, so its thickness needs to be inspected closely. Furthermore, for large structural panels made of composite material, it is difficult to ensure that both bearing faces are accurately parallel. This expansion and lack of parallelism can give rise to problems when assembling items of equipment such as the valve together with its actuator.

Various solutions exist for mitigating that problem. Thus, finishing machining may be performed directly on the panel in order to obtain the design assembly tolerances. However that involves an additional operation that is relatively lengthy. It is also possible to add metal spacers on either side of the panel, which spacers are adjusted prior to assembling the valve and the actuator and act as an interface between those members and the faces of the panel against which they bear. Nevertheless, those constitute additional parts that increase the volume and the weight of the assembly as a whole.

OBJECT AND SUMMARY OF THE INVENTION

An object of the invention is to facilitate proper mutual positioning of the valve and of the actuator but without significant extra cost, weight, or assembly time.

To this end, the invention provides an aircraft comprising;
a fuel valve;
an actuator for controlling the valve; and
a tank panel extending between the valve and the actuator;
the aircraft being arranged in such a manner that the bearing point(s) between the panel and a first one of the members selected from the valve and the actuator, preferably the actuator, is/are provided entirely by means of the second one of these members.

Thus, the second member thus fully determines the position of the first member relative to the panel. The relative positioning of the two members thus becomes independent of the panel. Regardless of the nature of the panel, be it made of metal material or composite material, and regardless of its dimensional qualities, in particular in terms of the thickness or the parallelism of its faces, it is ensured that the valve and the actuator are properly positioned relative to each other, and in particular that they lie on a common axis. This result is obtained without any additional part and without lengthening assembly time.

Advantageously, the first member is rigidly fastened to the second member independently of the panel.

Preferably, an empty space is provided between the first member and the panel.

It is thus certain that the panel does not influence the position of this member.

Advantageously, at least one of the members extends facing the panel.

Preferably, the second member includes fastener elements passing through the panel.

Advantageously, the fastener elements form male elements suitable for being received in female elements for fastening the second member to the panel.

Advantageously, the fastener elements form female elements suitable for receiving male elements for fastening the first member to the second member.

Provision may also be made for the panel to comprise a composite material or a metal.

Advantageously, the aircraft includes a metallization element in contact with the panel and suitable for removing electrostatic charge coming from each of the members.

Thus, the invention does not prevent any electric charge that might accumulate in one or other of the members being removed to a specific metallic structure.

BRIEF DESCRIPTION OF THE DRAWINGS

Other characteristics and advantages of the invention appear further from the following description of an embodiment and variants given as non-limiting examples with reference to the accompanying drawings, in which:

FIG. 1 is a perspective view of an aircraft of the invention;

FIGS. 2 and 3 are two perspective views respectively in an exploded state and in an assembled state, showing the arrangement of a valve and an actuator for a fuel tank in the FIG. 1 aircraft;

FIG. 4 is a section view of the FIG. 3 arrangement in a plane perpendicular to the panel;

FIG. 5 is a view on a larger scale of a detail D in FIG. 4;

MORE DETAILED DESCRIPTION

Figure 6:
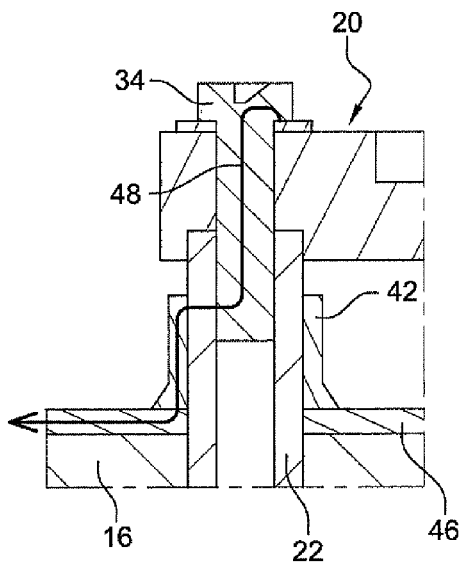
FIGS. 6 and 7 are views analogous to FIG. 5, showing the removal of electric charge respectively from the actuator and from the valve in the arrangement of FIG. 3.

An embodiment of the aircraft of the invention is described below with reference to FIGS. 1 to 8.

FIG. 1 is an overall view of the aircraft. In the present example it is an aerodyne, and specifically an airplane 2. The airplane has a fuselage 4 and two wings 6. It includes a tail fin 8 and jets 10, there being two jets in this example, each fastened to a respective wing. The airplane is for transporting cargo and/or one or more people. At the front of the fuselage 4 there is a cockpit 12 that is to be occupied by at least one pilot.

The airplane has one or more fuel tanks 14, each forming an enclosure defined by at least one structural panel 16. The tank contains kerosene, but it could equally well contain some other type of fuel. The panel 16 in this example is made of composite material comprising plastics material reinforced by a matrix of fibers such as carbon fibers. In a variant, provision could be made for the panel 16 to be made exclusively of metal.

The tank 14 includes a valve 18 within the enclosure. This valve is associated with an electric actuator 20 situated outside the tank. The valve 18 and the actuator 20 extend on opposite sides of the panel 16.

There follows a description of how the valve and the actuator are assembled to the panel. It should be understood that the tank could have one or more assemblies of this type, and thus in particular could have a plurality of valves.

The function of the actuator is to control the valve so as to allow or prevent the flow of fuel through the valve out from the tank by using conventional means that are not described in detail herein. The actuator is itself remotely controlled by means of an electric signal by means that are not described in detail.

The valve 18 presents a wall, a metal wall in this example, having a plane face 21 that forms a sole plate. The valve has a plurality of fastener elements projecting from said face and formed specifically by metal pins 22, each having a hollow cylindrical shank of cross-section that is annular in shape. The shank is threaded on its outside face and also on its inside face in the distal end zone of the pin that is remote from the sole plate 21. The pins are of a length that is greater than the thickness of the panel 16. Thus, when the valve is positioned together with its sole plate 21 in surface contact against the inside face 24 of the panel, the pins 22 then extend through respective through orifices 26 in the panel and project from the outside of the panel.

The actuator 20 has an essentially flat base 28. The base presents through orifices 30 and an end face 32 for facing towards the panel 16. This face is indented by a cavity in register with each orifice 30. The actuator 20 includes an electrical power supply port 23.

The actuator is installed in such a manner that each pin 22 has its distal end penetrate into the corresponding cavity, which is coaxial with the corresponding orifice 30. The distal end of the pin bears against the end of the cavity. Each pin is associated with a screw 34 that penetrates into the base from a face thereof facing away from the panel 16 with a head of the screw coming to bear against said face via an interposed washer 36. The thread of the screw meshes with the inside thread of the pin 22. This fastens the base rigidly to the pins and thus fastens the actuator to the valve. Specifically, there are six pins 22, this number not being limiting, which pins are regularly spaced apart around a main axis of the valve and of the actuator that is occupied by a fluted shaft 40.

Each pin 22 is also associated with a nut 42 engaged on the pin and having a thread that co-operates with the outside thread of the pin. Each nut comes to bear against the outside face 44 of the panel for fastening each pin, and consequently the valve 18, rigidly to the panel 16.

In order to avoid electrostatic charge accumulating in the valve and the actuator, and thus in order to avoid electric arcs appearing between the valve or the actuator and the remainder of the aircraft, the valve and the actuator in this example are electrically connected to a specific metallic structure of the airplane that is not described in detail herein. This connection is referred to herein by the term "metallization".

If the panel 16 is made of metal, then prior to assembling the valve and the actuator, the outside surface 44 of the panel is stripped clean in the zones where the metal nuts 42 are going to bear against it. This ensures that there is an electrical connection between the nuts and the panel 16.

If the panel is made of a composite material, then one or more metallization strips 46 are provided in the assembly. Such a flat metal strip presents orifices enabling it to be threaded onto the pins 22 and then to come to bear against the face 44. The nuts themselves come to bear against the strip 46.

Figure 7:
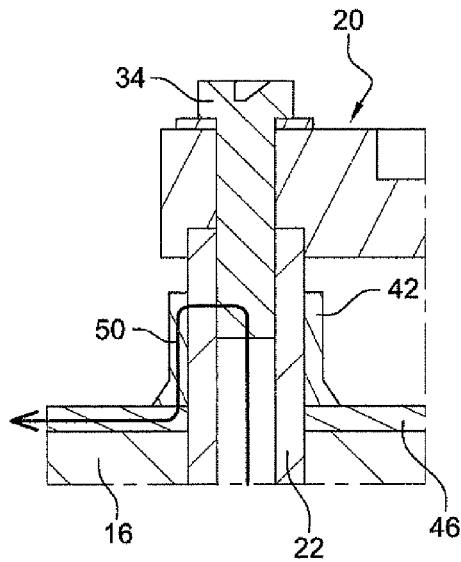

FIGS. 6 and 7 show such a configuration for removing electric charge in the form of an electric current, in FIG. 6 from the actuator 20, and in FIG. 7 from the valve 18. In FIG. 6, current 48 flows from the actuator 20 to the strip 46 via the screw 34, the pin 22, and then the nut 42, all four of these elements being made of metal. In FIG. 7, current 50 passes from the valve 18 to the strip 46 via the pin 22 and the nut 42.

The position of the actuator 20 relative to the valve 18 is fully determined by the actuator bearing against the top of the pins. It is solely through the pins that the actuator is fastened to the panel 16. The actuator bears against the panel entirely and exclusively via the valve 18. Similarly, the actuator is rigidly fastened to the valve independently of the panel.

Specifically, a space 52 is even provided between the outside face 44 of the metallization strip 46 and the face of the base 28 that faces towards the panel. This space is free of any part and is occupied solely by air, ignoring the presence of the shaft 40.

It can also be seen that although the valve 18 and the actuator 20 both face the panel 16, it is only the valve in this example that is in contact therewith. A gasket 54 is provided specifically in the sole plate 21 so as to ensure that its contact with the inside face 24 is leaktight with respect to the fuel surrounding the valve.

The above-described arrangement presents numerous advantages. It can be adapted to any type of structure and in particular regardless of the kind of material, metal or composite, that constitutes the panel 16 of the tank. It thus enables pieces of equipment that are identical in form to be provided for an entire family of airplanes. The same model of valve and the same model of actuator can be used on several variants of a given airplane regardless of any variation in the thickness of the panel 16 and without there being any need to add a part that involves increasing weight. This arrangement does not give rise to any increased cost. Although it may be advantageous to retouch or machine the inside face 24 of the panel, such treatment is not essential on its outside face 44. In the absence of any additional part, this constitutes a solution for assembly that is relatively lightweight, particularly when the solution is reproduced at several locations in the airplane. The assembly is easily tested with various structure samples. If an assembly or operating problem should arise, searching for its causes is simplified. In particular, there is no need to verify the panel of the structure for defects.

Figure 8:
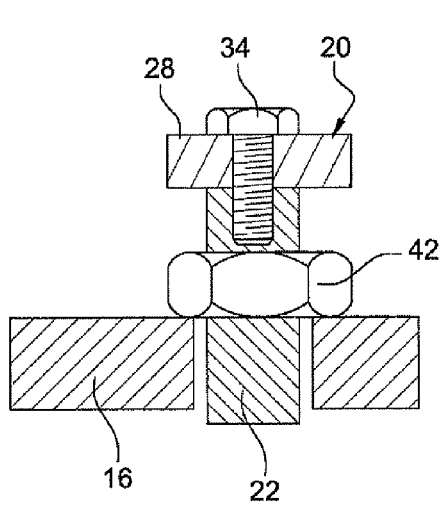
FIG. 8 is a view analogous to FIG. 5 showing the assembly principle.
Figure 9:
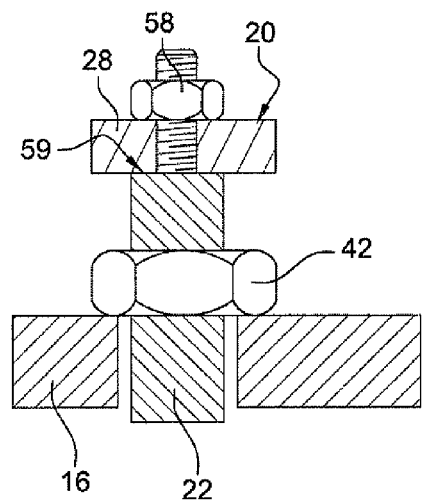
FIG. 9 is a view analogous to FIG. 8 showing a variant embodiment of the assembly.

The assembly principle made possible by the pins 22 is shown in FIG. 8. The pin 22 serves as a male part for the nut 42 and also as a female part for the screw 34. A variant of this principle is shown in FIG. 9. Here, the screw 34 is replaced by another nut 58. This time the pin is longer and passes through the entire thickness of the base 28 of the actuator 20 so as to enable the nut 58 to be screwed onto the distal end of the pin, with the nut engaging with another thread provided on the outside face of the pin. At this distal end, the pin presents a shoulder 59 against which the base 28 comes to bear as held in position by the nut 58. In this arrangement, the pin 22 thus serves as a male part for co-operating with both of the nuts 42 and 58.

The invention enables the valve and the actuator to be assembled together without suffering any impact from possible variations in the thickness or the parallelism of the panel 16. The invention makes it possible to ensure the valve and the actuator are electrically in contact with the electrical structure provided within the airplane for removing excess charge. It enables standard existing fastener elements to be used (screws, nuts, washers, pins, . . . ).

Naturally, numerous modifications may be applied to the invention. Provision may be made for the valve to be fastened to the panel preferably fully and exclusively, by means of the actuator.

What is claimed is:

1. An aircraft, comprising:
a fuel valve;
an actuator for controlling the fuel valve; and
a tank panel extending between the fuel valve and the actuator;
wherein one of the fuel valve and the actuator is fastened to the panel solely through the other of the fuel valve and the actuator, and
wherein the other of the fuel valve and the actuator includes fastener elements passing through the panel.

2. An aircraft according to claim 1, wherein the one of the fuel valve and the actuator is rigidly fastened to the other of the fuel valve and the actuator independently of the panel.

3. An aircraft according to claim 1, wherein an empty space is provided between the one of the fuel valve and the actuator and the panel.

4. An aircraft according to claim 1, wherein at least one of the fuel valve and the actuator extends facing the panel.

5. An aircraft according to claim 1, wherein the fastener elements form male elements suitable for being received in female elements for fastening the other of the fuel valve and the actuator to the panel.

6. An aircraft according to claim 1, wherein the fastener elements form female elements suitable for receiving male elements for fastening the one of the fuel valve and the actuator to the other of the fuel valve and the actuator.

7. An aircraft according to claim 1, wherein the panel comprises a composite material.

8. An aircraft according to claim 1, wherein the panel comprises a metal.

9. An aircraft according to claim 1, including a metallization element in contact with the panel and suitable for removing electrostatic charge coming from each of the fuel valve and the actuator.

10. An aircraft according to claim 1, wherein the actuator is fastened to the panel solely through the fuel valve.

11. An aircraft, comprising:
a fuel valve;
an actuator for controlling the fuel valve; and
a tank panel extending between the fuel valve and the actuator;
wherein one of the fuel valve and the actuator bears against the panel entirely and exclusively via the other of the fuel valve and the actuator, and
wherein the other of the fuel valve and the actuator includes fastener elements passing through the panel.

12. An aircraft according to claim 11, wherein the one of the fuel valve and the actuator is rigidly fastened to the other of the fuel valve and the actuator independently of the panel.

13. An aircraft according to claim 11, wherein an empty space is provided between the one of the fuel valve and the actuator and the panel.

14. An aircraft according to claim 11, wherein at least one of the fuel valve and the actuator extends facing the panel.

15. An aircraft according to claim 11, wherein the fastener elements form male elements suitable for being received in female elements for fastening the other of the fuel valve and the actuator to the panel.

16. An aircraft according to claim 11, wherein the fastener elements form female elements suitable for receiving male elements for fastening the one of the fuel valve and the actuator to the other of the fuel valve and the actuator.

17. An aircraft according to claim 11, wherein the panel comprises a composite material.

18. An aircraft according to claim 11, wherein the panel comprises a metal.

19. An aircraft according to claim 11, including a metallization element in contact with the panel and suitable for removing electrostatic charge coming from each of the fuel valve and the actuator.

20. An aircraft according to claim 11, wherein the actuator bears against the panel entirely and exclusively via the fuel valve.

* * * * *